(12) United States Patent
Klehr et al.

(10) Patent No.: US 11,561,208 B2
(45) Date of Patent: Jan. 24, 2023

(54) THERMORESISTIVE GAS SENSOR

(71) Applicant: Siemens Aktiengesellschaft, Munich (DE)

(72) Inventors: Stefan Klehr, Rheinzabern (DE); Günter Marcaux, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 521 days.

(21) Appl. No.: 16/713,245

(22) Filed: Dec. 13, 2019

(65) Prior Publication Data
US 2020/0191755 A1   Jun. 18, 2020

(30) Foreign Application Priority Data
Dec. 17, 2018   (EP) .................................... 18213202

(51) Int. Cl.
*G01N 30/66* (2006.01)
*G01N 25/18* (2006.01)
(Continued)

(52) U.S. Cl.
CPC ............. *G01N 30/66* (2013.01); *G01N 25/18* (2013.01); *G01F 1/684* (2013.01); *G01F 1/6845* (2013.01);
(Continued)

(58) Field of Classification Search
CPC .. G01N 30/66; G01N 25/18; G01N 2030/025; G01N 2030/3053; G01N 27/14;
(Continued)

(56) References Cited

U.S. PATENT DOCUMENTS

| 4,447,292 A | 5/1984 | Schuster-Woldan et al. |
| 7,010,971 B2 | 3/2006 | Matsumoto et al. |

(Continued)

FOREIGN PATENT DOCUMENTS

| DE | 1698048 | 4/1972 |
| DE | 3204425 | 8/1983 |

(Continued)

OTHER PUBLICATIONS

Rastrello et al., "Thermal Conductivity Detector for gas-chromatography: Acquisition system and experimental measurements", 2013 IEEE International Instrumentation and Measurement Technology Conference (I2MTC), IEEE, pp. 1226-1230, 2012.

(Continued)

*Primary Examiner* — Randy W Gibson
*Assistant Examiner* — John M Royston
(74) *Attorney, Agent, or Firm* — Cozen O'Connor (57) ABSTRACT

A thermoresistive gas sensor includes two identical, flat meshes that consist of a semiconductor material with a predetermined type of conductivity and that are interconnected in sections of an electric measuring bridge that are diametrically opposite one another, wherein each mesh of the two identical, flat meshes has mesh webs that extend parallel, adjacent to one another and that are connected electrically in parallel at the ends, where the mesh webs of the two meshes extend alternately adjacent to one another in a shared mesh plane horizontally across a window opening in a carrier plate.

14 Claims, 5 Drawing Sheets

(51) Int. Cl.
*G01N 30/02* (2006.01)
*G01N 30/30* (2006.01)
*G01F 1/684* (2006.01)
*G01F 1/69* (2006.01)
*G01F 1/692* (2006.01)
*G01N 25/20* (2006.01)

(52) U.S. Cl.
CPC .............. *G01F 1/69* (2013.01); *G01F 1/692* (2013.01); *G01N 25/20* (2013.01); *G01N 2030/025* (2013.01); *G01N 2030/3053* (2013.01)

(58) Field of Classification Search
CPC ....... G01N 25/20; G01F 1/684; G01F 1/6845; G01F 1/692; G01F 1/69
See application file for complete search history.

(56) References Cited

U.S. PATENT DOCUMENTS

| | | |
|---|---|---|
| 2002/0020689 A1 | 2/2002 | Leung |
| 2002/0038508 A1 | 4/2002 | Trausch |
| 2003/0015034 A1 | 1/2003 | Iwaki et al. |
| 2004/0031320 A1 | 2/2004 | Trausch |
| 2004/0056321 A1 | 3/2004 | Parsons |
| 2007/0204688 A1 | 9/2007 | Dmytriw et al. |
| 2016/0341681 A1 | 11/2016 | Gellert et al. |
| 2016/0341682 A1 | 11/2016 | Gellert |
| 2018/0034413 A1* | 2/2018 | Kirsammer ............... H03D 3/24 |
| 2019/0301908 A1 | 10/2019 | Kisban et al. |

FOREIGN PATENT DOCUMENTS

| | | |
|---|---|---|
| EP | 1510814 | 3/2005 |
| EP | 3096133 | 11/2016 |
| EP | 3096137 | 11/2016 |
| EP | 3196659 | 7/2017 |
| EP | 3546931 | 10/2019 |
| JP | H08219836 | 8/1996 |
| WO | WO00/59824 | 10/2000 |
| WO | WO2007/101185 | 9/2007 |
| WO | WO2009/095494 | 8/2009 |
| WO | WO2009/153099 | 12/2009 |
| WO | WO2017/194319 | 11/2014 |
| WO | WO 2017/125481 | 7/2017 |

OTHER PUBLICATIONS

EP Search Report dated Mar. 28, 2019 based on EP18213202 filed Dec. 17, 2018.
Office Action dated Jul. 15, 2021 issued in European Patent Application No. 18213202.7.

* cited by examiner

THERMORESISTIVE GAS SENSOR

BACKGROUND OF THE INVENTION

1. Field of the Invention

The invention relates to sensors and, more particularly to, a thermoresistive gas sensor.

2. Description of the Related Art

A thermoresistive sensor or detector is a measuring sensor with an electrical resistor having a value that changes reproducibly with temperature. Such resistors are also referred to as thermistors, where a distinction is made between thermistors with a positive temperature coefficient (PTC thermistor) and thermistors with a negative temperature coefficient (NTC thermistor). PTC thermistors particularly include in metals, where platinum and nickel are preferably used, and as non-metallic materials polycrystalline ceramics, e.g., based on barium titanate and doped semiconductors, e.g., silicon, with impurity fatigue. NTC thermistors particularly include in pure or doped semiconductors outside of the region of impurity depletion and polycrystalline semiconductors made from metal oxides.

Thermoresistive gas sensors are used, for instance, as flow sensors or thermal conductivity detectors in gas analysis or in medical technology (e.g., anesthetic or respiratory protection apparatuses).

Thermal flow sensors are used, for instance, in gas analysis or in medical technology (e.g., anesthetic or respiratory protection apparatuses). The underlying measuring principle is based on the use of a sensor element that is heated electrically and the electrical resistance of which depends on the temperature. When a fluid is flowing, a heat transmission, which changes with the flow speed, occurs into the fluid. By measuring the electric variables of the sensor element, the flow can be detected and its speed or the mass flow of the fluid can be measured. In particular, in order to detect alternating currents, the sensor element, together with a further sensor element arranged upstream or downstream, can be arranged in the flow so that a crosstalk occurs in the form of a heat exchange between the sensor elements, which alternates correspondingly with a periodically alternating flow. This can be measured in a manner known per se via an electric measuring bridge, in which the sensor elements are arranged in different bridge sections.

Thermal conductivity detectors are used to verify specific liquid or gaseous substances (fluids) based on their thermal conductivity typical of a substance and are particularly employed in gas chromatography. To this end, the substances to be verified will be directed consecutively, in accordance with their chromatographic separation, into a channel on an electrically heated heating element (e.g., a heating filament made from gold or platinum) arranged thereon, where depending on the heat conductivity of the substance flowing past, more or less heat is conveyed from the heating element onto the channel wall and the heating element cools down more or less accordingly. Its electrical resistance, which is detected, changes as a result of the heating element cooling down. If the heating element is regulated to a constant temperature, then the changing electrical heating power is detected. The heating element is typically arranged in a measuring bridge that contains further resistors and a further heating element in a further channel through which a reference fluid passes.

One such thermal conductivity detector with meander-shaped heating filaments is known, for instance, from Rastrello F. et al: "Thermal Conductivity Detector for gas-chromatography: Acquisition system and experimental measurements", 2013 IEEE INTERNATIONAL INSTRUMENTATION AND MEASUREMENT TECHNOLOGY CONFERENCE (I2MTC), IEEE, May 13, 2012 (2012 May 13), pages 1226-1230.

WO 2009/153099 A1 discloses a flow sensor formed as a silicon-based microflow sensor for gas analysis. The conventional flow sensor consists of two panel-shaped components, which each have a window-type opening for the through-flowing gas and a mesh structure made from silicon which extends thereover. The two components are combined to form a panel compound, where the two openings are aligned with one another and the mesh structures aligned at right angles to the flow direction lie one behind the other in the direction of the flow. The mesh structures are produced from crystalline silicon for instance by using silicon-on-insulator (SOI) wafer material and are formed to be meander-shaped.

Compared to similar wire meshes with electric resistance values of a few ohms, such as those known, for instance, from DE 1 698 048 A1, DE 32 04 425 A1 or WO 00/59824 A1, the resistance of the silicon-based mesh is in the range of a few kiloohms. This higher resistance value results in an improved signal-to-noise ratio. Furthermore, the greater resistance coefficient compared with metals results in a higher measuring sensitivity, i.e., in higher temperature-dependent changes in resistance.

The mesh structures of the conventional flow sensor mentioned in WO 2009/153099 A1 can consist of a number of adjacent sub-mesh structures, which are likewise formed in a meander-shape and can be connected in series to increase the resistance, for instance. In particular, four meshes can be interconnected to form an electric measuring bridge, where the meshes that are diametrically opposite one another in the measuring bridge each form a mesh pair with a shared mesh plane and the two different mesh pairs lie one behind the other in the flow to be measured. As a result, a significantly higher measuring sensitivity is produced than with measuring bridges, in which only two bridge resistances of resistance meshes are formed in the flow to be measured and the two other bridge resistances consist of fixed resistances.

WO 2017/194319 A1 likewise discloses a flow sensor with four thermoresistive sensor elements, which are interconnected to form an electric measuring bridge. The sensor elements are arranged one behind the other in the flow direction and are formed to this end, for instance, in a series adjacent to one another on one side of a substrate as thin layer sensor elements with meander-shaped resistance structures. The flow to be measured therefore does not flow through the meander-shaped resistance structures, but instead along them. The two first sensor elements in the series are diametrically opposite one another in the measuring bridge; the same applies to both last sensor elements.

US 2003/015034 A1 discloses a flow sensor with a heating element and a temperature sensor which, in the flow direction of the fluid to be measured, are arranged one behind the other on a membrane and are formed there as meander-shaped resistance layers. Both the heating element layer and also the thermometer layer can have a conductor path configuration, in which individual resistance elements are connected in parallel.

With the conventional flow sensor disclosed in U.S. Pat. No. 7,010,971 B2, one heating element and four temperature sensors are formed on a membrane, wherein the heating elements are arranged in pairs upstream and downstream of the heating element in the flow direction. The temperature sensors are formed as meander-shaped resistance layers, which are arranged nested into one another in the case of each pair and are connected in sections of an electric measuring bridge that are diametrically opposite one another.

With a similar flow sensor disclosed in JP H08219836 A, the sensor elements that are each diametrically opposite one another in the measuring bridge are not arranged one behind the other in the flow, but instead in the flow direction at the same height, but on different sides of the substrate which face away from one another.

With a further similar flow sensor disclosed in WO 2007/101185 A1, the four sensor elements with their meander-shaped resistance structures are again arranged on one side of the substrate. The sensor elements that are each diametrically opposite one another in the measuring bridge are not arranged one behind the other in the flow direction, but instead interdigitally, i.e., the meandering loops of the sensor elements interlock with one another in the form of an interdigital structure.

WO 2009/095494 A1 discloses a thermal conductivity detector with an electrically heatable heating filament, which is mounted so that a fluid can circulate in the center and in the longitudinal direction of a channel and for this purpose is held at its two ends on two electrically conducting carriers that traverse the channel. In order to sustain a long service life and inertia with respect to chemically aggressive gas mixtures, the heating filaments and the carriers consist of doped silicon. The doped silicon can be applied to a silicon substrate by interposing an insulating layer made of silicon dioxide, where the carrier and the heating filament are formed and the channel is molded in the carrier plate in etching processes via structuring the silicon substrate, the silicon dioxide layer and the layer made from doped silicon. In view of the brittleness of silicon, in order to increase the mechanical stability EP 3 096 133 A1 describes the replacement of the heating filaments mounted on both sides using an extremely thin cantilever made from doped silicon.

On account of the high electrical resistance of the silicon heating filament, a higher detection sensitivity of the thermal conductivity detector is achieved compared with heating filaments made from metal (typically gold or platinum). This also specifies a higher voltage drop across the heating resistor, if this is heated to a desired temperature with a specific heating power, so that, if applicable, an intrinsically safe operation in hazardous areas is not possible. EP 3 096 137 A1 therefore proposes to divide the silicon heating filaments into two or more segments, which are arranged physically in series in the flow of the fluid and are connected electrically in parallel.

A thermoresistive gas sensor with a flat mesh through which gas can flow, the mesh webs of which consisting of semiconductor material and connected electrically in parallel being arranged in parallel adjacent to one another in the mesh plane and being formed to extend in an s-shape, is the subject matter of the former as yet unpublished European patent application with the official application number EP18164748.8.

US 2004/056321 A1 discloses a planar heater, in which a heating element is formed on a substrate, where the heating element consists of lines that extend in parallel in an s-shape adjacent to one another and are electrically connected in parallel at the ends.

SUMMARY OF THE INVENTION

In view of the foregoing, it is therefore an object of the invention to provide a thermoresistive gas sensor, which can be used similarly as a flow sensor or thermal conductivity detector, and which is characterized by a high measuring sensitivity and mechanical stability and can be produced easily and cost-effectively.

This and other objects and advantages are achieved in accordance with the invention by thermoresistive gas sensor, a flow sensor containing at least two such gas sensors and a thermal conductivity detector, where the thermoresitive gas sensor has two identical, flat meshes through which a gas can flow, which consist of a semiconductor material with a predetermined conductivity type and are connected in sections of an electric measuring bridge which are diametrically opposite one another, where each mesh has mesh webs that extend parallel adjacent to one another and are electrically connected in parallel at the ends, and the mesh webs of the two meshes alternatively adjacent to one another in a shared mesh plane extend in a horizontal manner across a window opening in a carrier plate.

The two meshes are the same or identical and their mesh webs lie alternately adjacent to one another in one and the same mesh plane. As a result, both meshes are exposed to a gas in practically the same way, where the gas reaches the meshes through the window opening and, depending on use, flows through between the mesh webs or flows around the mesh webs in the longitudinal direction. Each change in the composition, the flow speed or in the flow profile of the gas reaches both meshes at the same time and the change influences their temperature-dependent electrical resistance at the same time and to the same degree. The sensitivity of the measuring bridge with the meshes arranged diametrically therein is twice as large with at least the same accuracy as with a gas sensor with only one mesh and a fixed resistor diametrically opposite the measuring bridge.

With the inventive gas sensor, the meshes are not formed to be meander-shaped, but instead they consist of both physical and also electrically parallel webs. The mesh webs with their semiconductor material form temperature-dependent resistors which, compared with metal, are high-resistance and therefore, as mentioned already above, enable a high detection sensitivity of the sensor. The webs or the resistors formed thereby are connected in parallel. As a result, the overall resistance of the respective mesh and thus the electrical voltage dropping across the mesh in the case of a predetermined heating power is low, which allows for an intrinsically safe operation of the gas sensor in hazardous areas.

Compared with metal, doped semiconductor material in particular is to be considered as high-resistance material for the semiconductor layer, therefore, e.g., silicon, which is also characterized by its inertia with respect to chemically aggressive gas mixtures. A positive temperature coefficient (PTC) or negative temperature coefficient (NTC) can be realized as a function of the doping. By using monocrystalline semiconductor material, a good mechanical stability is achieved, to which end the direction-dependence of the elasticity module and of the piezoresistive coefficient can also be used.

In fact, the meander-shaped meshes of the conventional gas sensors mentioned in the introduction also have parallel mesh segments, but these are connected electrically in series.

The semiconductor-based meshes can be heated to higher temperatures than conventional wire meshes. The mesh webs in the mesh plane can therefore be formed to extend in an s-shape, so that they are not deflected in an uncontrolled manner when being heating or extended or even bend. Instead, the distance between the webs is retained and they are not able to touch.

The mesh webs can have cross-sectional surfaces that vary across the width of the meshes. Therefore, the outer mesh webs can be formed with a larger cross-sectional surface (width) than those of the inner mesh webs, in order to obtain a uniform temperature distribution across the width of the respective mesh and to avoid the mesh webs disposed in the middle of the respective mesh from heating more significantly than those at the edge of the mesh.

The meshes can essentially be generated in different ways, for instance, via etching, laser cutting or 3D printing. The semiconductor material is preferably established in the form of a semiconductor layer on a semiconductor substrate forming the carrier plate, possibly by interposing an insulating layer, where the semiconductor layer extends across the window opening in the semiconductor substrate and is established there in the form of the two meshes. Outside of the window opening, the semiconductor layer carries metallizations in four areas extending at least across the width of the mesh, where the metallizations connect the mesh webs electrically with one another at the four ends of the two meshes. The metallizations can be connected with separately formed contact surfaces for contacting the gas sensor or can form the contact surfaces themselves. Furthermore, the semiconductor layer outside of the window opening contains separating structures that isolate four ends of the meshes from one another. The separating structures can be formed because the semiconductor material is removed or not doped in areas. The separating structure can be formed by insulating layers between the mesh webs of the other mesh and the metallization precisely there where, e.g., a metallization results in the mesh webs of one of the two meshes connecting beyond the mesh webs of the other mesh.

The inventive gas sensor is advantageously used in a flow sensor, where, together with at least one further gas sensor of the same construction, it is arranged in a gas flow to be measured so that the meshes lie one behind the other and at right angles to the flow direction, and where all four meshes of the two gas sensors are interconnected to form the electric measuring bridge, in which the meshes of each of the two gas sensors each diametrically opposite one another. The measuring bridge is therefore formed entirely from the four meshes of the flow sensor, so that no fixed resistors are required to complete the measuring bridge. Depending on the direction of the gas flow to be measured, heat is transmitted from the two meshes of the one gas sensor to the meshes of the other gas sensor, so that the meshes of the two different gas sensors experience an opposite temperature-dependent change in resistance, while within each gas sensor each of the two meshes experience the same change in resistance. A maximum sensitivity of the flow sensor is achieved on account of the afore-specified diagonal interconnection of the meshes in the measuring bridge. It may be advantageous for the manufacture of the flow sensor if the four afore-cited metallizations extend in one direction about a predetermined degree beyond the width of the mesh, in order to form at this location contact surfaces, and if the semiconductor substrate (together with semiconductor layer arranged thereupon and if applicable insulating layer) in the other direction contains through openings arranged in mirror symmetry with the contact surfaces. The two gas sensors can then be easily assembled on top of each other offset by 180° relative to one another, where the contact surfaces of the lower gas sensor are accessible through the openings of the gas sensor arranged thereupon and both gas sensors can therefore be contacted from one side, the top side.

The inventive gas sensor is also advantageously used in a thermal conductivity detector, where it can be arranged in a measuring gas flow with the meshes longitudinally to the flow direction. To this end, the gas sensor can be held between two components, each of which contains a cavity that opens toward the meshes and is flush with the window opening in the carrier plate. The two cavities together form a measuring space, in which the measuring gas, which is introduced into the measuring space by way of gas connections, circulates around the meshes and is siphoned out thereof. The two gas connections can be formed such that they extend in the direction of the measuring space over the width of the meshes, so that the measuring gas flows across the entire surface of the mesh. Each of the two components can contain one of the two gas connections in each case. In order to simplify the structural configuration of the thermal conductivity detector and its use, both gas connections can alternatively be disposed in one of the two components.

When used in a gas chromatograph, in which the measuring gas in a carrier gas flow is doped and is subsequently routed through a separating column or separating column circuit in order to separate different components of the measuring gas, a further thermoresistive gas sensor constructed in the same way can advantageously be arranged in the reference gas flow and with the meshes longitudinally relative to the flow direction, where all four meshes of the two gas sensors are interconnected to form the electric measuring bridge, in which the meshes of each of the two gas sensors are diametrically opposite one another in each case.

The inventive thermoresistive gas sensor is equally suited to use in a flow sensor, for instance, in a non-dispersive infrared (NDIR) analysis device or a gas analyzer operating in accordance with the paramagnetic alternating pressure method, and in a thermal conductivity detector for the gas chromatography or for the analysis of binary gas mixtures. The electrical interconnection of the gas sensor, e.g., in a bridge circuit, is known per se and is not the subject matter of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

To further explain the invention, reference is made below to the figures in the drawing, in which.

DETAILED DESCRIPTION OF THE EXEMPLARY EMBODIMENTS

The representations in the Figures are shown schematically and not true to scale, but can indicate qualitative proportions.

The same or similar components in different figures are provided with the same reference characters.

Figure 1:
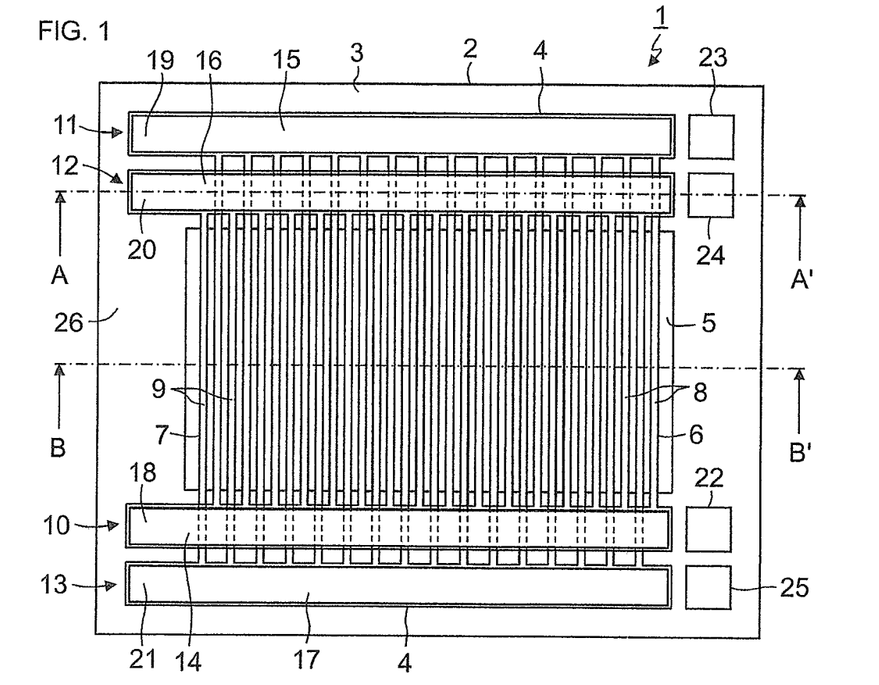
FIG. 1 is a top view of an exemplary embodiment of the inventive gas sensor with two meshes.
Figure 2:
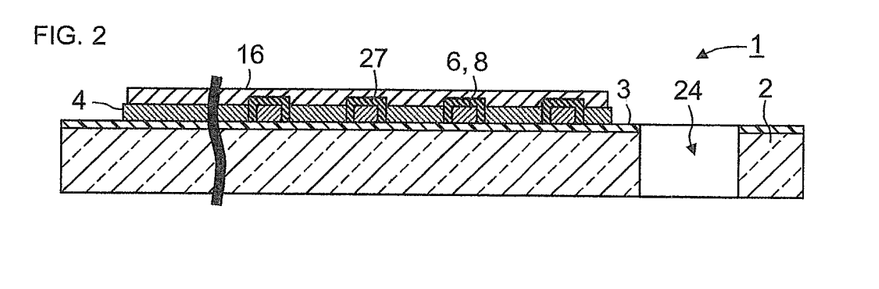
FIG. 2 is a cross-section through the gas sensor along a line AA' in FIG. 1.

The gas sensor 1 has a carrier plate 2 in the form of a semiconductor substrate made from silicon, for instance, to which a semiconductor material in the form of a semiconductor layer 4 is applied by interposing an insulating layer 3 made of, e.g., silicon dioxide. The semiconductor material has a type of conductivity that is predetermined by doping, for instance, where it is conductive with high-resistance compared with metal. The carrier plate 2 and the insulating layer 3 disposed thereabove contain a window-type cut-out (window opening) 5, across which the semiconductor layer 4 extends and is structured there by forming two identical meshes 6, 7. The two meshes 6, 7 each consist of a plurality of mesh webs 8 or 9, which extend parallel to one another in a shared mesh plane and are alternately disposed adjacent to one another. The window opening 5 and the meshes 6, 7 can be produced via an etching process. The mesh webs 8, 9 form high-resistance resistors, the resistance values of which is defined by the length and the cross-sectional surface of the mesh webs 8, 9.

The mesh webs 8, 9 are connected to one another at the ends 10, 11, 12, 13 of each of the two meshes 6, 7 and are electrically connected in parallel in this way. To this end, the semiconductor layer 4 on the semiconductor substrate 2 on both sides of the window opening 5 is reduced in each case to two rectangular island areas, which each extend across the width of the meshes 6, 7 and between which the mesh webs 8, 9 extend beyond the window opening 5. The rectangular islands made from semiconductor material which, at these points, can be doped as far as deterioration and thus maximally conductive, are provided with metallizations 14, 15, 16, 17 across almost the entire surface. As shown, the rectangular islands with the metallizations 14, 15, 16, 17 in one direction can extend by a predetermined degree beyond the width of the meshes 6, 7, in order to form contact surfaces 18, 19, 20, 21 at this location. In the other direction, the semiconductor substrate 2 can contain through openings 22, 23, 24, 25 arranged in mirror symmetry with the contact surfaces 18, 19, 20, 21.

The ends 10, 11, 12, 13 of the two meshes 6, 7, i.e., the rectangular islands made from the semiconductor material with the metallizations 14, 15, 16, 17, are separated or isolated from one another via separating structures 26, in which the semiconductor material of the semiconductor layer 4 is downwardly removed as far as the insulating layer 3. The separating structure 26 is formed by insulating layers 27, which surround the relevant mesh webs 7 and insulate with respect to the overlying metallization 16 and the semiconductor of the one mesh 7, precisely there where the metallizations (e.g., 16), of the one mesh (e.g., 7), lead past the mesh webs 8 of the other mesh 6. The insulation layers 27 can consist of silicon dioxide in the same way as the insulation layer 3 (see FIG. 2).

As already mentioned, the mesh webs 8, 9 consisting of the semiconductor material form temperature-dependent resistors, which are high-resistance compared with metal and therefor enable a high detection sensitivity of the gas sensor 1. With each of the two meshes 6, 7, the mesh webs 8, 9 are connected electrically in parallel. As a result, the overall resistance of the relevant mesh 6, 7 and thus the electrical voltage dropping across the mesh 6, 7 with a predetermined heating power is low, which allows for an intrinsically safe operation of the gas sensor 1 in hazardous areas.

Figure 3:
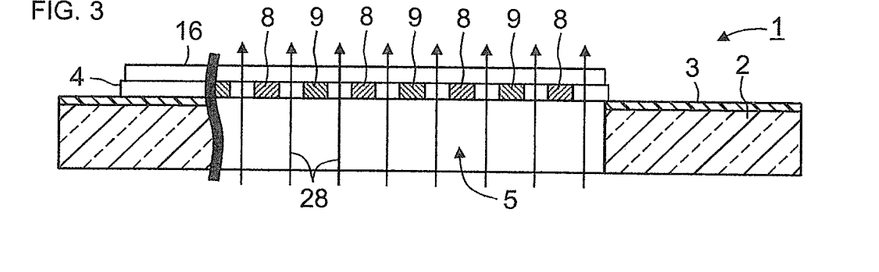
FIG. 3 is a cross-section through the gas sensor along a line BB' in FIG. 1.

The two meshes 6, 7 are the same and their mesh webs 8, 9 are disposed alternately adjacent to one another in one and the same mesh plane. As a result, both meshes 6, 7 are exposed to a gas 28 in practically the same way, where the gas reaches the meshes 6, 7 through the window opening 5 and flows through between the mesh webs 8, 9 or around the mesh webs 8, 9. Each change in the composition, the flow speed or in the flow profile of the gas 28 reaches both meshes 6, 7 at the same time and the change influences their temperature-dependent electric resistor at the same time and to the same degree (see FIG. 3).

Figure 4:
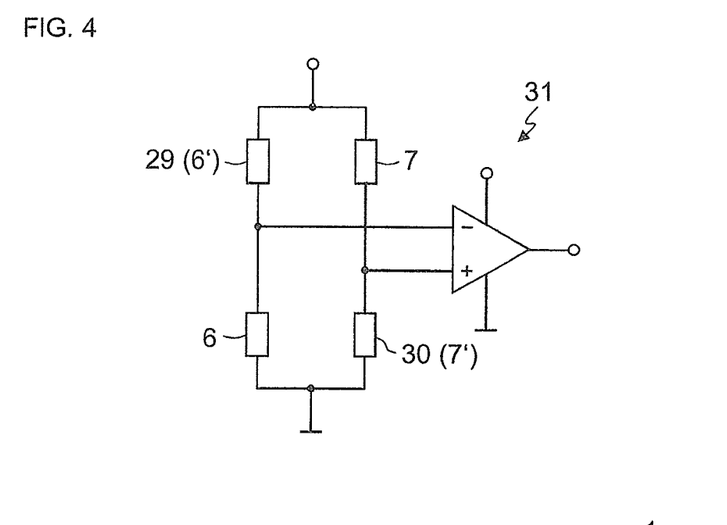
FIG. 4 is an illustration of a measuring bridge, in which the meshes of the gas sensor are interconnected as bridge resistors in accordance with the invention.

FIG. 4 shows the electric arrangement of the two meshes 6, 7 of the gas sensor 1 together with further resistors (e.g., fixed resistors) 29, 30 in a measuring bridge (Wheatstone bridge) 31. The two meshes 6, 7 are arranged in sections of the measuring bridge 31 that are diametrically opposite one another, so that their sensitivity is twice as large as with a conventional gas sensor with just one mesh and one fixed resistor diametrically opposite in the measuring bridge.

Figure 5:
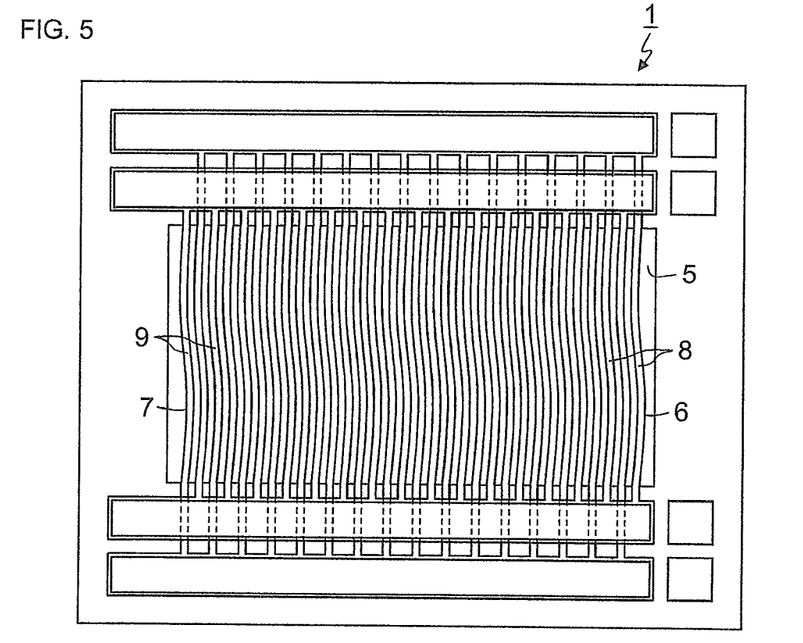
FIGS. 5, 6 and 7 show top views of a further exemplary embodiment of the inventive gas sensor.

FIG. 5 shows one embodiment of the gas sensor 1, in which the webs 8, 9 of the mesh 6, 7 are formed to extend in an s-shape in the mesh plane, so that when heated and expanded they are not deflected in an uncontrolled manner or even bent. Instead, the distance between the webs 8, 9 is retained and they cannot touch.

Figure 6:
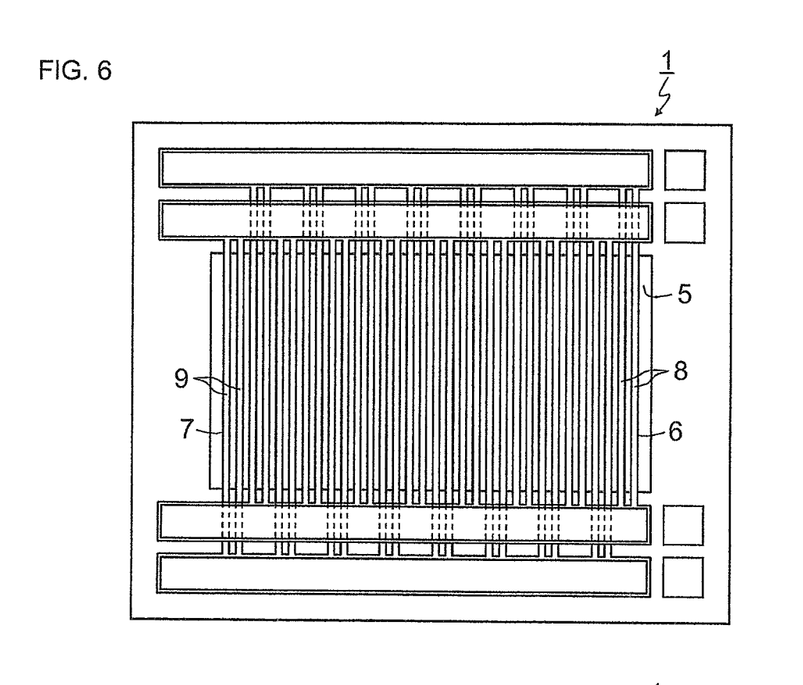

FIG. 6 shows an embodiment of the gas sensor 1, in which the webs 8, 9 of the two meshes 6, 7 do not lie individually but instead in groups of two alternately adjacent to one another in the shared mesh plane above the window opening 5.

Figure 7:
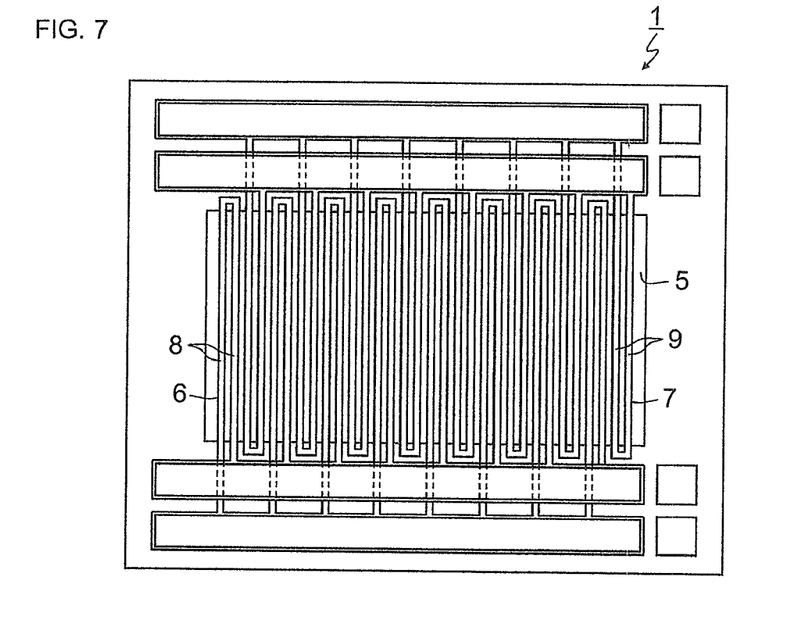

FIG. 7 shows a further embodiment of the gas sensor 1, in which the webs 8, 9 of the two meshes 6, 7 likewise lie in groups of two alternately adjacent to one another in the shared mesh plane above the window opening 5. Within each group of two, the two webs are not parallel but are instead connected in series in the form of a U-loop, as a result of which the electrical resistance of the respective mesh 6, 7 is doubled.

In the exemplary illustrated embodiments, the cross-section of the mesh webs can amount to, e.g., 1 μm×1 μm to 100 μm×100 μm, so that with a cross-section of 10 μm×10 μm and a size of the window opening 5 of 1 mm×1 mm, the two meshes 6, 7 would each have up to 25 webs.

In order to obtain a uniform temperature distribution across the width of the meshes 6, 7 and to prevent the mesh webs 8 or 9 disposed in the center of the respective mesh 6 from heating up more significantly than those at the edge of the mesh, the outer mesh webs 8, 9 can be formed with a larger cross-sectional surface (width) than those of the inner mesh webs 8, 9.

Figure 8:
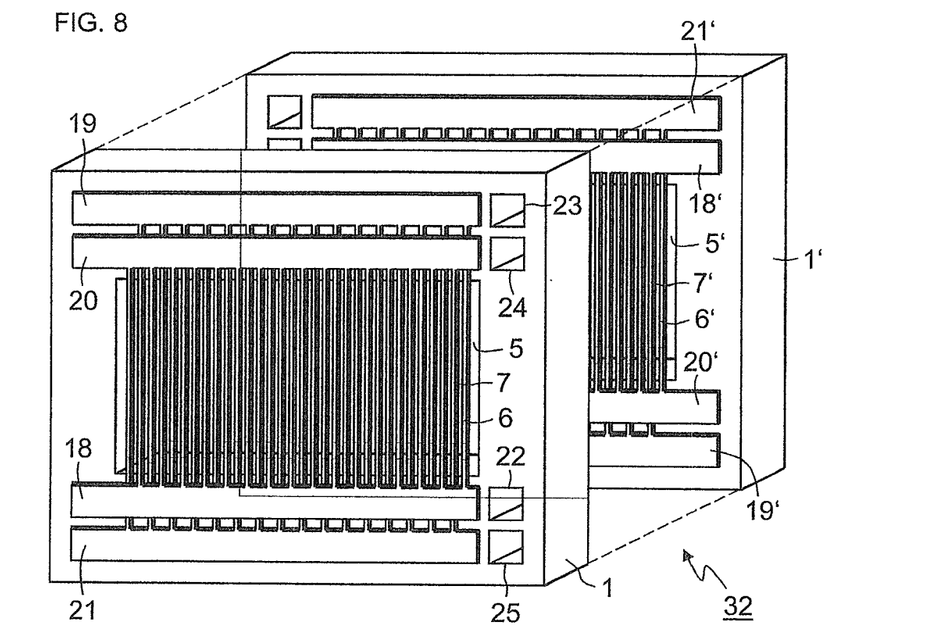
FIG. 8 is a perspective exploded view of an exemplary embodiment of a flow sensor with two gas sensors.

FIG. 8 shows a perspective exploded view of a flow sensor 32 comprising two gas sensors 1, 1' of the same construction in a panel compound.

Figure 9:
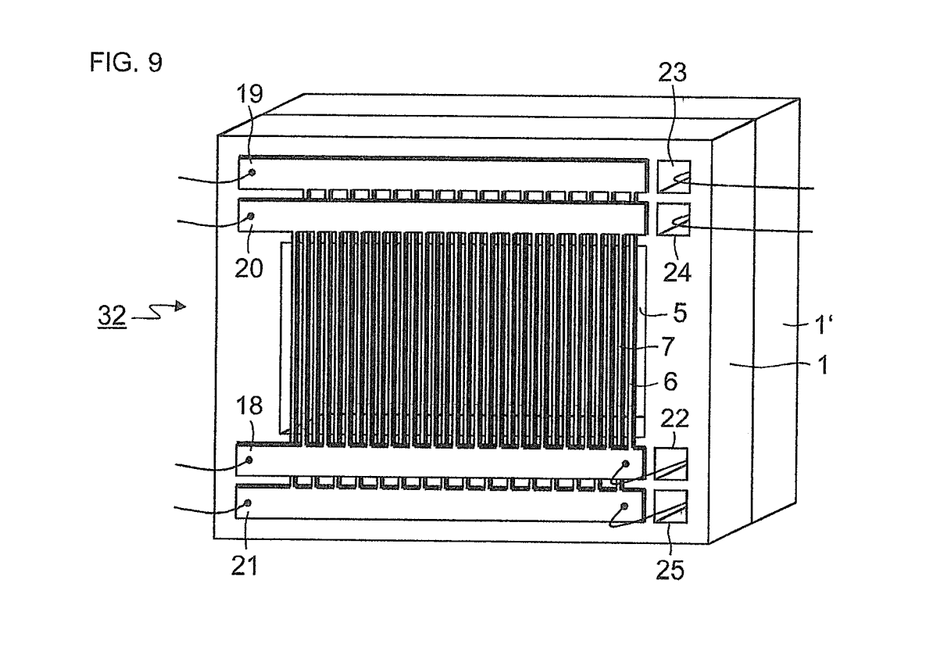
FIG. 9 is an illustration of the flow sensor of FIG. 6 with joined gas sensors.

FIG. 9 shows the same flow sensor 32 in the assembled state.

The two gas sensors 1, 1' lie, if applicable by interposing a surface seal and/or a thermally insulating intermediate layer, or suchlike, one on top of the another, where their window openings 5, 5' are aligned with one another. The mesh pairs 6, 7 and 6', 7' of the gas sensors 1, 1' are located in parallel one behind the other at a distance, which is essentially provided by the thickness of the semiconductor substrate (carrier plate 2). Here, the distance can be set exactly to a definable value via an intermediate layer. The gas sensors 1, 1' are offset relative to one another by 180°, so that the contact surfaces 18', 19', 20', 21' of the lower gas sensor 1' are accessible through the openings 24, 25, 22, 23 of the gas sensor 1 disposed thereupon and the flow sensor 32 can be contacted from one side.

As FIG. 4 shows, all four meshes 6, 7, 6', 7' of the two gas sensors 1, 1' are interconnected to form the electric measuring bridge 31, in which the meshes 6, 7 or 6', 7' of each of the two gas sensors 1 and 1' are each diametrically opposite one another.

Figure 10:
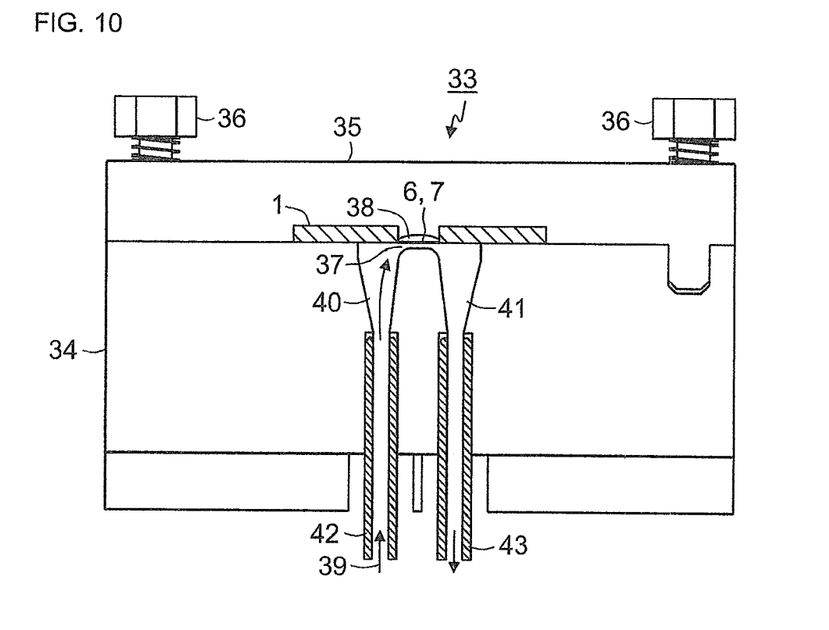
FIGS. 10 and 11 is an illustration of an exemplary embodiment of a thermal conductivity detector with a gas sensor in one section in the longitudinal direction and in the transverse direction relative to the meshes.
Figure 11:
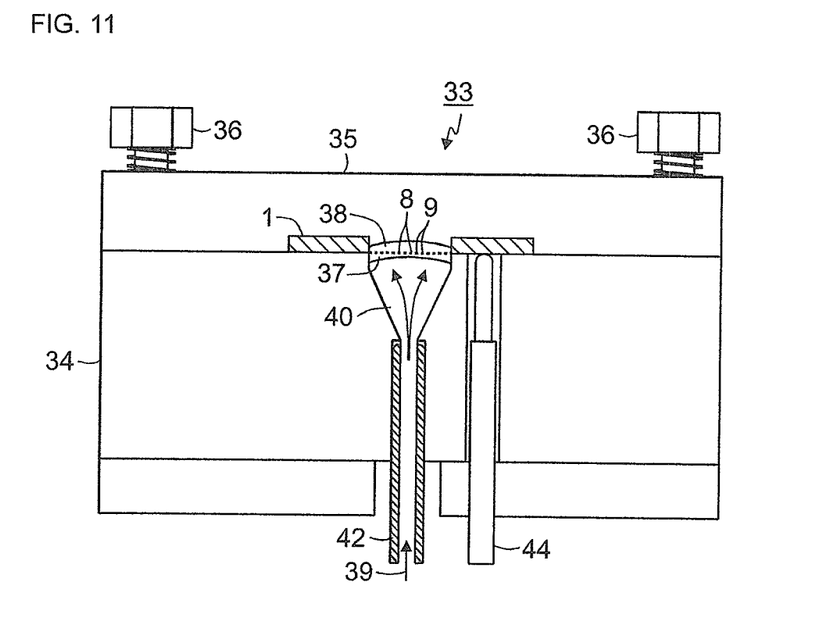

FIG. 10. and FIG. 11 show an exemplary embodiment of a thermal conductivity detector 33 containing the gas sensor 1, once in a cutout longitudinally relative to the meshes 6, 7 or the mesh webs 8, 9 and once in a cutout at right angles thereto. The gas sensor 1 is arranged between two components, here a block-shaped main body 24 (e.g., made from aluminum), and a cover 35 (e.g., made from aluminum or polyetheretherketone (PEEK)), in a cutout of the cover 35 and with the meshes 6, 7, arranged horizontally toward the main body 34. The components 34, 35 are connected to one another via screws 36 and by interposing a surface seal or seal film (not shown here). Both the main body 34 and also the cover 35 each contain a cavity 37, 38 that opens toward the meshes 6, 7 and is aligned with the window opening 5 of the gas sensor 1. The two cavities 37, 38 form a measuring space, in which a measuring gas 39 circulates around the meshes 6, 7, said measuring gas being introduced into and removed from the measuring space via two gas connections 40, 41. Each of the two components 34, 35 can essentially contain one of the two gas connections 40, 41 in each case. In order to simplify the structural configuration of the thermal conductivity detector 33 and its use, in the exemplary illustrated embodiment both gas connections 40, 41 are located in the main body 34 and open into the cavity 37 in the regions of the ends of the meshes 6, 7. The gas connections 40, 41 are formed, for instance, by milling or laser machining in the form of channels in the main body 34, into which cannulas 42, 43 are inserted. The gas sensor 1 is likewise contacted on the side of the main body 34 by spring contact pins 44.

The first tube-shaped gas connections 40, 41 extend in the direction of the cavity 37 over the width of the mesh 6, 7 so that a laminar spreading or expansion of the measuring gas 39 occurs and the measuring gas 39 flows across the entire surface of the meshes 6, 7. To ensure that the measuring gas 39 does not touch the webs 8, 9 of the mesh 6, 7, but instead circulates entirely around them, the base of the cavity 37 can be curved convexly in the longitudinal direction of the mesh 6, 7 or the mesh webs 8.9. In addition, the base of the other cavity 38 in the cover 35 can be curved concavely accordingly in the longitudinal direction of the mesh 6, 7, so that the distance between the bases of both cavities 37, 38 largely remains the same and no extension or restriction of the measuring space occurs in the direction of the flow of the measuring gas 39.

The meshes 6, 7 are interconnected in the measuring bridge 31, as shown in FIG. 4.

Upon use in, e.g., a gas chromatograph, a further gas sensor or thermal conductivity detector of the same construction can be arranged in a reference gas flow and with the meshes longitudinally with respect to the flow direction, where all four meshes of the two gas sensors are interconnected to form the electric measuring bridge 31 and in which the meshes of each of the two gas sensors are diametrically opposite one another.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A thermoresistive gas sensor comprising:
   a carrier plate; and
   two identical, flat meshes through which gas flows in a direction within the thermoresistive gas sensor perpendicular to the carrier plate, said two identical, flat meshes consisting of a semiconductor material with a predetermined conductivity and being interconnected in sections of an electric measuring bridge which are diametrically opposite one another;
   wherein each mesh of the two identical, flat meshes has mesh webs which extend parallel and adjacent to one another and are connected electrically in parallel at ends and the mesh webs of the two identical, flat meshes extend alternately adjacent to one another in a shared mesh plane horizontally across a window opening in the carrier plate.

2. The thermoresistive gas sensor as claimed in claim 1, wherein the mesh webs are formed to extend in an s-shape in the shared mesh plane.

3. The thermoresistive gas sensor as claimed in claim 1, wherein the mesh webs have cross-sectional surfaces which vary across a width of the two identical, flat meshes.

4. The thermoresistive gas sensor as claimed in claim 2, wherein the mesh webs have cross-sectional surfaces which vary across a width of the two identical, flat meshes.

5. The thermoresistive gas sensor as claimed in claim 1, wherein the semiconductor material is formed as a semiconductor layer on a semiconductor substrate forming the carrier plate, which extends across a window opening in the semiconductor substrate and is formed there in the form of the two identical, flat meshes,
   wherein the semiconductor layer outside of the window opening carries metallizations in four areas extending at least across the width of the two identical, flat meshes, said metallizations connecting the mesh webs electrically to one another at the four ends of the two identical, flat meshes; and wherein the semiconductor layer contains separating structures outside of the window opening, which insulate the four ends of the two identical, flat meshes from one another.

6. The thermoresistive gas sensor as claimed in claim 5, further comprising:

an insulating layer formed between the semiconductor substrate and the semiconductor layer.

7. The thermoresistive gas sensor as claimed in claim 5, wherein the four metallizations extend by a predetermined amount beyond the width of the meshes in order to form there contact surfaces; and wherein the semiconductor substrate in another direction contains through openings arranged in mirror symmetry with the contact surfaces.

8. The thermoresistive gas sensor as claimed in claim 6, wherein the four metallizations extend in a direction about a predetermined degree beyond the width of the meshes in order to form there contact surfaces; and wherein the semiconductor substrate in another direction contains through openings arranged in mirror symmetry with the contact surfaces.

9. A flow sensor with two identically constructed thermoresistive gas sensors arranged one behind the other in a gas flow to be measured and with meshes of the two identically constructed thermoresistive gas sensors at right angles to a gas flow direction as claimed in claim 1, wherein all four meshes of the two identically constructed gas sensors are interconnected to form the electric measuring bridge, in which the meshes of each of the two identically constructed gas sensors are each diametrically opposite one another.

10. The flow sensor with two identically constructed thermoresistive gas sensors arranged one behind the other in a gas flow to be measured and with four meshes of the two identically constructed thermoresistive gas sensors at right angles to the flow direction as claimed in claim 7, wherein all four meshes are interconnected to form the electric measuring bridge;

wherein the meshes of each of the two identically constructed thermoresistive gas sensors are each diametrically opposite one another; and wherein the two identically constructed thermoresistive gas sensors are offset by 180° relative to one another such that the contact surfaces of the lower gas sensor are accessible through the openings of the gas sensor disposed thereupon.

11. A thermal conductivity detector with a thermoresistive gas sensor arranged in a measuring gas flow and with the meshes longitudinally relative to the flow direction as claimed in claim 1.

12. The thermal conductivity detector as claimed in claim 11, wherein the gas sensor is held between two components which each contains a cavity which opens toward the meshes and is aligned with the window opening in the carrier plate; wherein one of (i) each of the two cavities includes a gas connection and (ii) one of the two cavities includes two gas connections in end regions of the meshes and the two gas connections extend in a direction of a respective cavity over a width of the meshes.

13. The thermal conductivity detector as claimed in claim 9, further comprising:

a further thermoresistive gas sensor having a construction identical to the two identically constructed thermoresistive gas sensors, arranged in a reference gas flow and with meshes longitudinally to the flow direction; and wherein all four meshes of the two gas sensors are interconnected to form the electric measuring bridge;

wherein the meshes of each of the two identically constructed thermoresistive gas sensors are each diametrically opposite one another.

14. The thermal conductivity detector as claimed in claim 12, further comprising:

a further thermoresistive gas sensor having a construction identical to the two identically constructed thermoresistive gas sensors, arranged in a reference gas flow and with meshes longitudinally to the flow direction;

wherein all four meshes of the two gas sensors are interconnected to form the electric measuring bridge; and wherein the meshes of each of the two identically constructed thermoresistive gas sensors are each diametrically opposite one another.

\* \* \* \* \*